United States Patent Office 2,924,584
Patented Feb. 9, 1960

2,924,584

COMPOSITION COMPRISING POLYETHYLENE AND AN ETHYLENICALLY UNSATURATED ALIPHATIC HYDROCARBON OF 20-35 CARBON ATOMS AND ARTICLE THEREOF

Leon E. Wolinski, Buffalo, N.Y., assignor to E. I. du Pont de Nemours and Company, Wilmington, Del., a corporation of Delaware No Drawing. Application June 20, 1956
Serial No. 592,502

8 Claims. (Cl. 260—33.6)

This invention relates to the manufacture of polyethylene structures and coatings. More particularly it relates to the preparation of polyethylene film suitable for conversion to bags, containers and similar packages.

One of the disadvantages of polyethylene film in the packaging field resides in its low adhesiveness to dried ink impressions, polymeric coatings, other substrates such as glass, wood, paper, and thermoplastic films other than polyethylene. The result is that any information imprinted on the surface of the polyethylene film such as instructions, advertising, trademarks or recipes are smeared or rubbed off by the normal abrasion suffered by the film during handling. This shortcoming has been substantially overcome by so-called printability treatments described in U.S. Patents 2,502,841; 2,632,921; 2,648,097; 2,668,134; 2,715,075; 2,715,076; 2,715,077 and several patent applications disclosed hereinafter. However, these treatments in turn have caused another problem. The ability of polyethylene to adhere to itself by the application of pressure and heat, i.e. heat-sealability, necessary in converting the film to packages, although satisfactory prior to the printability treatment, falls below satisfactory levels after treatment.

The object of the present invention is to provide a polyethylene structure, particularly film, having improved properties. Another object is to improve the heat-sealability of polyethylene structures without sacrificing the desirable properties of the polyethylene structures. Another object is to provide polyethylene structures and polyethylene coatings having a high level of adhesiveness to printing inks and the like, that can be easily heat-sealed. A more specific object is to provide a polyethylene composition, which when formed into a structure or used as a coating and subjected to a printability treatment, will provide a printable and heat-sealable structure. Other objects will appear hereinafter.

The objects are accomplished by a structure formed from a polyethylene resin having a weight average molecular weight of 15,000-3,000,000 (normally from 200,000 to 1,500,000) and containing a small amount, i.e. at least about 0.1% and preferably not more than about 10% based on the weight of the polyethylene resin, of at least one ethylenically unsaturated hydrocarbon, said hydrocarbon having a softening temperature no greater than the lower temperature of the crystalline melting point range of the polyethylene resin, preferably below 100° C., an average normal boiling point above the optical melting point of the polyethylene resin, preferably above 325° C., and a melt viscosity, at a temperature above 110° C., lower than that of the polyethylene resin.

Although it is possible to define a melting point for the monomeric hydrocarbon additives, the nature of the polymeric hydrocarbons makes it possible only to specify a softening temperature rather than a melting point. Since softening temperature is the more general term applying to both the monomeric and polymeric hydrocarbon additives, it will be used throughout the specification. The softening temperature is determined by placing a chip of the additive on a highly polished copper block and raising the temperature of the block uniformly. The lowest temperature at which the additive sample leaves a molten trail when moved across the block by applying light pressure with a spatula is the softening temperature.

In the case of a polyethylene resin, there is a narrow temperature range over which the crystallites melt. The crystalline melting point or the optical melting point, as observed through a polarizing microscope, is the temperature at which there is a disappearance of double refraction when a thin film of the sample is heated slowly through the melting range on a microheating stage.

The hydrocarbon is preferably blended uniformly into the polyethylene composition prior to extrusion. However, the hydrocarbon may be incorporated into the polyethylene resin at any stage during formation of the polyethylene structure or it may be added to the surface of the polyethylene structure after formation.

The aliphatic hydrocarbons suitable for this invention may be straight or branched aliphatic or cyclo-aliphatic hydrocarbons. They may be monomeric or polymeric. They should preferably contain at least 8 carbon atoms in a straight chain and may contain more than one ethylenic linkage per molecule. In the following table are listed some unsaturated aliphatic hydrocarbons which fit the requirements of the present invention.

| Compound | Softening* Temperature (° C.) | Normal* Boiling Point (° C.) |
|---|---|---|
| 1-nonene | −82 | 147. |
| 2-nonene | −80 | 150. |
| 3-nonene | −79 | 146. |
| 2-methyl-1-octene | −78 | 145. |
| 1-decene | −66 | 171. |
| 1-undecene | −49 | 193. |
| 5-undecene | below −30 | 188. |
| 1-dodecene | −34 | 213. |
| 6-dodecene | below −25 | 212. |
| 1-hexadecene | 4 | 286. |
| 1-eicosene | 29 | 151 @ 1.5 mm. |
| 1-heneicosene | 36 | 134 @ 0.04 mm. |
| 1-docosene | 41 | 176 @ 0.6 mm. |
| 1-tricosene | below 30 | above 200 @ 15 mm. |
| 11-tricosene | 18 | 225 @ 15 mm. |
| 1-triacontene | 62 | 218 @ 0.5 mm. |
| 17-pentatriacontene | 67 | above 325. |
| 1,4-nonadiene | below 30 | 147. |
| 1,4-decadiene | do | 170. |
| 1,4-undecadiene | do | 186. |
| 1,3-dodecadiene | −52 | 101 @ 13 mm. |
| 1,17-octadecadiene | below 100 | 168 @ 10 mm. |
| 1,19-eicosadiene | do | 197 @ 10 mm. |
| hexatriacontadiene | 48 | above 325. |
| tetratetracontadiene | 61 | Do. |
| 1-cyclopentylbutene-2 | below 100 | 157. |
| 2-cyclohexylpropene-1 | do | 158. |
| 1-cyclohexylbutene-2 | do | 177. |
| "Ucon" DXL-1-11 [a] | 32 | Does not Distil. |
| "Butarez" 15 [b] | 18 | Do. |
| "Hydropol" TP [c] | 79 | Do. |
| "Hydropol" V [d] | 63 | Do. |
| balata [e] | 49 | Do. |

*Normal (at 760 mm. of mercury) softening and boiling points are given unless otherwise specified.

[a] A low molecular weight polyethylene manufactured by Union Carbide and Carbon Chemical Corp.

[b] A low molecular weight polybutadiene manufactured by the Phillips Petroleum Company (molecular weight of 1500).

[c] A low molecular weight polybutadiene which has been reduced by hydrogen to an unsaturation level of 8% manufactured by Phillips Petroleum Company.

[d] A low molecular weight polybutadiene which has been reduced with hydrogen to an unsaturation level of 20% manufactured by Phillips Petroleum Company.

[e] A "trans" form of natural rubber having a low molecular weight and containing unsaturation.

The preferred compounds are those containing from 20–35 carbon atoms in a straight chain, i.e. eicosene to pentatriacontenes. Polymeric aliphatic hydrocarbons containing ethylenic linkages and having a number average molecular weight between 1000 and 5000 are another preferred group of compounds. These latter compounds are derived from low molecular weight aliphatic unsaturated hydrocarbons such as ethylene, propylene, butadiene, etc. and have softening temperatures below 100° C. while their normal boiling points are well above 325° C. Of the above compounds the following have proved most useful and hence are particularly preferred: 11-tricosene, 17-pentatriacontene, and polybutadiene having a number average molecular weight of 1500.

This invention provides polyethylene structures which display a marked improvement in heat-sealability as shown by high heat-seal strength. Furthermore, the polyethylene structures are more readily heat-sealed to form seals of substantial strength at lower heat-sealing temperatures than used heretofore.

As mentioned previously, the most important application of this invention is to polyethylene structures, particularly film, whose surface adhesion has been improved by a so-called printability treatment. It is believed that this printability treatment "roughens" or modifies the surface of the polyethylene structure to create thereon microscopic "hills" not detectable by touch and not visible to the naked eye. A polyethylene film surface is considered to be satisfactorily roughened if the surface of the film contains substantially uniformly distributed "hills or mounds," each individual hill or mound having a diameter, as measured parallel to the film surface, of at least 0.05 micron to 1 micron, and usually between 0.05 micron to 0.5 micron. The elevation or height of these hills or mounds relative to the "flat" areas, i.e., areas which appear to be relatively untreated, is seldom greater than 0.2–0.5 micron, and usually not greater than 0.25 micron. As a general rule, the printability treatments do not carve out areas of the film surface to form depressions therein, but rather form hills or mounds having elevations relative to the untreated film surface. Besides improving printability (adhesion to printing inks), these treatments tend to improve the adhesive qualities of the surface of polyethylene structures to organic coatings in general. However, as mentioned previously, these treatments reduce the ability of polyethylene to adhere to itself when pressure and heat are applied.

For purposes of this invention, the adhesiveness of the surface of the polyethylene structure may be improved by any of a number of known expedients. These include superficial treatment of the polyethylene structure with chlorine gas described in U.S. Patent No. 2,502,481 to Henderson; treatment in a saturated solution of sodium dichromate in concentrated sulfuric acid, in U.S. Patent No. 2,668,134 to Horton. U.S. Patent No. 2,632,921 to Kreidl, discloses a process of subjecting the surface of the polyethylene structure to a temperature above about 60° C. while maintaining the underlying parts of the structure at a temperature below about 50° C. Similarly, U.S. Patent No. 2,648,097 to Kritchever discloses exposing the surface to a gas flame while the opposite surface is supported on a cool drum. Other techniques involve treating the surface with ozone while maintaining the structure at temperatures above 150° C.; that is, the molten structure immediately after extrusion (in the air gap) may be treated with a gas containing ozone. This process is described and claimed in a copending application, U.S. Serial No. 323,271, filed November 29, 1952, by L. E. Wolinski. L. E. Wolinski has other patents and applications that involve treatment with ozone: U.S. Patent No. 2,715,075 relates to treatment in the presence of ozone and a halogen or hydrogen halide; U.S. Patent No. 2,715,076 relates to treatment with ozone in the presence of nitrous oxide; U.S. Serial No. 323,274 filed November 29, 1952, now U.S. Patent No. 2,805,960, relates to treatment with ozone at a temperature of at least 150° C. followed by quenching the structure in an aqueous solution containing a halogen or halogen acid; and U.S. Serial No. 323,275, filed November 29, 1952, now U.S. Patent No. 2,801,446, relates to treatment with ozone at a temperature of at least 150° C. followed by quenching the structure in a bath containing a conditioning agent such as hydrogen peroxide, nitrous acid, alkaline hypochlorites, concentrated nitric acid or mixtures of concentrated nitric acid and concentrated sulphuric acid. Treating the molten polyethylene structure, maintained at a temperature above 150° C., with nitrous oxide is described in U.S. Patent 2,715,077 to L. E. Wolinski. The adhesiveness of the surface of polyethylene may also be improved by quenching a freshly extruded film in an aqueous bath containing a halogen or a halogen acid as described in copending application U.S. Serial No. 347,391, filed April 7, 1953, now U.S. Patent No. 2,801,447, by L. E. Wolinski. The polyethylene structure may be heated with a special conditioning agent such as hydrogen peroxide, concentrated nitric acid, nitrous acid, alkaline hypochlorites, or mixtures of concentrated nitric acid and concentrated sulphuric acid, as described in copending application U.S. Serial No. 487,701, filed February 11, 1955, now U.S. Patent No. 2,878,519, by L. E. Wolinski. The use of high voltage stress accompanied by corona discharge, as disclosed in British Patent Nos. 715,914 and 722,875, may also be used. Surfaces of relatively high-density polyethylene structures may be made more adhesive by quenching a freshly formed structure after extruding at a temperature of at least 325° C. as described in U.S. Serial No. 506,660 filed May 6, 1955 by I. Swerlick.

Specific embodiments of the present invention are presented in the following examples, Example 2 representing the best mode contemplated for performing the invention. In all the examples except examples in Table VI, Bakelite DYNH-3 [1] polyethylene resin flake was used. This particular resin has its lower temperature of the crystalline melting point range at about 95° C., an optical melting point of 109° C., a density of about 0.92 gram/cc. and a weight average molecular weight of 750,000–1,000,000.

EXAMPLES 1–12

A mixture of polyethylene resin flake and a percentage as given in Table I, based on the weight of the resin, of the additives was melt blended in a Banbury mixer at a temperature ranging from 180° C. to 200° C. The blend was transferred to a rubber mill where it was milled at 145° C.–150° C. to form a sheet. The sheet was chipped into flakes and fed to an extrusion apparatus.

The blend was remelted in the extrusion apparatus and extruded at 285° C. in the form of a film through a six inch air gap into a water quench bath maintained at about 30° C.

During its passage through the air gap, the molten polyethylene film underwent a printability treatment. The air gap was enclosed by a treating chamber. An ozone/oxygen mixture, containing about 1.2% ozone by volume, was passed through the chamber to contact one surface of the polyethylene film as described in U.S. Serial No. 323,271. The ozone/oxygen mixture passed through the chamber at rates of 0.49 cu.ft./min., 0.83 cu.ft./min., and 1.66 cu.ft./min. while the polyethylene film was led through the chamber at about 22 ft./min.

The properties of the resulting films, compared to a control film, are given in the following table. Heat-seal strength was measured in the following manner. The film samples were first cut into 6" squares. Squares from the same sample were then superimposed and sealed along one edge with a steel bar 3½" long and ⅛" wide at a temperature of 200° C. The seals were performed by using a dwell time of 0.15 second and a pressure of 10 lbs./sq.in. The heat-seals were made by sealing a surface that had undergone a printability treatment to a surface that had not, in a direction transverse to the direction in which the film was extruded. After heat-sealing, the connected squares were cut into strips 3" long and ½" wide. The free ends of the heat-seal strips were ---
[1] Manufactured by Union Carbide and Carbon Corp.

then pulled apart in a tensile testing apparatus at a rate of 100% per minute. The strength of the heat-seal, expressed in grams/in. of width represents the highest force necessary to pull the strips apart.

Printability was determined by applying "Excelobrite" W-500, an ink manufactured by Bensing Brothers & Deeney, to the surface of the film by a commercial ink spreader. The spreader was composed of a steel rod having fine wires wrapped around it and produced a plurality of fine white lines on the surface of the film. The ink was dried by exposure for 3 minutes to a temperature of 60° C. After the ink cooled to room temperature, a strip of pressure-sensitive tape was applied to the film surface and pressed firmly. The strip was then pulled from the surface of the film and examined to determine whether any ink was removed. If ink were removed, the structure was classified as "non-printable."

Table I.—Effect of additives on heat-seal strengths of printable polyethylene film

| Example | Percent Additive | Heat-Seal Strength (grams/inch) at Ozone/Oxygen Rate | | |
|---|---|---|---|---|
| | | 0.49 Cubic Ft./Min. | 0.83 Cubic Ft./Min. | 1.66 Cubic Ft./Min. |
| Control | None | 1,000 | 1,040 | 1,040 |
| 1 | 0.1% 11-tricosene | 1,250 | 1,275 | |
| 2 | 0.4% 11-tricosene | 1,345 | 1,330 | |
| 3 | 0.8% 11-tricosene | 1,375 | 1,290 | |
| 4 | 2.0% 11-tricosene | 1,430 | 1,320 | |
| 5 | 0.4% 17-pentatriacontene | 1,625 | 1,570 | |
| 6 | 0.8% 17-pentatriacontene | 1,385 | | |
| 7 | 1.0% 17-pentatriacontene | 1,305 | 1,305 | |
| 8 | 0.2% "Butarez" | 1,290 | 1,220 | |
| 9 | 0.4% "Butarez" | 1,360 | 1,180 | |
| 10 | 2.0% "Butarez" | 1,400 | | |
| 11 | 5.0% "Hydropol" V | | 1,205 | 1,375 |
| 12 | 5.0% "Hydropol" TP | | 1,655 | 1,400 |

EXAMPLES 13–16

In these examples printable polyethylene films, all but one containing additives in accordance with the present invention, were prepared in the manner described for Examples 1–12. To obtain printability, the ozone/oxygen mixture was passed through the treating chamber at a rate of 0.83 cu.ft./min. Heat-seal strengths were measured as in the previous examples except for the use of different sealing temperatures as disclosed in Table II.

Table II.—Heat-sealability of printable polyethylene film

| Example | Percent Additive | Heat-Seal Strength (grams/in.) Using Heat-Seal Temperatures of 150° C., 160° C., 180° C., and 200° C. | | | |
|---|---|---|---|---|---|
| | | 150° C. | 160° C. | 180° C. | 200° C. |
| Control | None | 200 | 270 | 570 | 800 |
| 13 | 0.8% 11-tricosene | 720 | 805 | 1,050 | 1,200 |
| 14 | 2.0% 11-tricosene | 670 | 710 | 1,020 | 1,220 |
| 15 | 0.8% 17-pentatriacontene | 580 | 760 | 1,025 | 1,180 |
| 16 | 1.0% 17-pentatriacontene | 606 | 740 | 1,034 | 1,193 |

EXAMPLES 17–23

Blends of polyethylene resin and the additives were prepared and melt extruded in the form of films as described for Examples 1–12. The extruded films passed through a 6 inch air gap into a water quench at 30° C. with no oxygen/ozone treatment in the air gap. Instead, printability was obtained by conducting the film from the water quench over a grounded steel drum rotating at a circumferential speed of 35 ft./minute. A Tesla coil was held ⅛" above the drum and discharged 30,000 volts across the width of the polyethylene film in a manner similar to that described in British Patent No. 715,914.

The properties of the resulting printable films compared to a control film that contained no additive but received the electrical discharge treatment, are given in the following table. Heat-seal strength was measured by sealing at the temperatures indicated in the table.

Table III.—Heat-seal strength of printable polyethylene film

| Example | Percent Additive | Heat-Seal Strength (grams/in.) Using Heat-Seal Temperatures of 160° C. and 200° C. | |
|---|---|---|---|
| | | 160° C. | 200° C. |
| Control | None | 425 | 925 |
| 17 | 0.2% 11-tricosene | 760 | 1,250 |
| 18 | 0.4% 11-tricosene | 960 | 1,263 |
| 19 | 0.6% 11-tricosene | 750 | 1,235 |
| 20 | 0.1% 17-pentatriacontene | 774 | 1,238 |
| 21 | 0.8% 17-pentatriacontene | 914 | 1,248 |
| 22 | 0.2% "Butarez" 15 | 824 | 1,270 |
| 23 | 0.4% "Butarez" 15 | 834 | 1,243 |

EXAMPLES 24–25

Blends of polyethylene resin and the additives were prepared and melt extruded in the form of films as described for Examples 1–12. The extruded films passed through a 6 inch air gap into a water quench at 30° C. with no ozone/oxygen treatment in the air gap. Instead, printability was obtained by treating the film at a speed of 100 ft./min. with a propane/air flame at a flame temperature of about 1900° C., the burner being about 3/32" from the surface of the film. The top surface of the film attained a temperature over 200° C. while the under surface passed over a chromium roll maintained at 2° C. The details of this printability treatment are given in U.S. Patent No. 2,648,097.

The properties of the resulting printable films, compared to a control film that contained no additive but received the flame treatment, are given in the following table.

Table IV.—Heat-seal strength of printable polyethylene film

| Example | Percent Additive | Heat-Seal Strength (grams/inch) Using Heat-Seal Temperatures of 160° C. and 200° C. | |
|---|---|---|---|
| | | 160° C. | 200° C. |
| Control | None | 38 | 380 |
| 24 | 0.2% 11-tricosene | 580 | 980 |
| 25 | 0.8% 17-pentatriacontene | 470 | 892 |

EXAMPLES 26–31

Polyethylene film was prepared as described for Examples 1–12 from a blend of resins containing 50% by weight "Bakelite" DYNH–3 and 50% "Alathon" 14 [1] omitting the additives and the ozone/oxygen treatment. The blended resin had a density of 0.917 gram/cc., a weight average molecular weight of between 750,000 and 1,000,000 and a crystalline melting point range from about 95° C. to an optical melting point of 108° C.

The additives were either dissolved in benzene or dispersed in water as indicated in the table and applied to the film by dipping the film into the solution or dispersion. The coated film was dried in a circulating air oven at about 60° C. Thereafter, the film was subjected to the electrical discharge treatment as described for Examples 17–23 or the flame treatment as described for Examples 24–25, as indicated in the table.

The results are presented in the following table.

[1] Manufactured by E. I. du Pont de Nemours & Company, Inc.

*Table V.—Heat-seal strength of printable polyethylene film*

| Example | Percent Additive in Medium | Printability Treatment | Heat-Seal Strength (grams/inch) |
|---|---|---|---|
| Control | | Electrical discharge. | 1,000 |
| 26 | 0.10% 11-tricosene in benzene | do | 1,906 |
| 27 | 0.12% 11-tricosene in benzene | do | 2,254 |
| 28 | 0.25% 11-tricosene dispersed in water. | do | 2,068 |
| Control | | Flame | 1,000 |
| 29 | 0.10% 11-tricosene in benzene | do | 2,054 |
| 30 | 0.12% 11-tricosene in benzene | do | 2,146 |
| 31 | 0.10% UCON-DXL-1-11 in benzene. | do | 2,206 |

EXAMPLES 32–37

A polyethylene film was prepared in the manner described for Examples 1–12 omitting the ozone/oxygen treatment. The results for these non-printable films are given in the following table. The heat-seal strengths of two commercial polyethylene films (products X and Y), containing no additives of the type disclosed herein, are also given for comparative purposes.

*Table VI.—Heat-seal strength of non-printable polyethylene film*

| Example | Percent Additive | Heat-Seal Strength (grams/inch) Using Heat-Seal Temperatures of 120° C., 145° C., and 160° C. | | |
|---|---|---|---|---|
| | | 120° C. | 145° C. | 160° C. |
| Control | None | No seal | | 300 |
| Product X | do | | 56 | |
| Product Y | do | | 180 | |
| 32 | 0.4% 11-tricosene | 748 | | 926 |
| 33 | 0.4% "Butarez" | 818 | | 1,044 |
| 34 | 0.4% UCON DXL-1-11. | 538 | | 1,168 |
| 35 | 1.0% "Balata" | 792 | | 838 |
| 36 | 5.0% "Hydropol" V | 746 | | 1,128 |
| 37 | 5.0% "Hydropol" TP | 908 | | 1,118 |

As shown by the examples, the invention is not only useful in preparing heat-sealable, printable polyethylene packaging film, but is useful in improving the heat-seal strength of polyethylene film in general, and in lowering the temperature required for satisfactory heat-seals. In the case of printable polyethylene packaging films, the addition of the unsaturated aliphatic hydrocarbons, in accordance with the invention serves to recover the heat-seal strength lost by the polyethylene film due to the printability treatment. The use of these special additives also tends to retard the loss of printability and heat-sealability of the polyethylene film with age such as inevitably occurs during storage prior to printing and conversion of film to bags.

Besides polyethylene film, the invention is applicable to other self-supporting structures such as filaments, rods, tubes, sheets for lamination and to supported polyethylene structures wherein polyethylene compositions containing the additives are coated on one or both sides of various base films such as cellophane, polyethylene terephthalate, polyvinylidene chloride, etc. It is applicable to polyethylene structures of normal density (0.91–0.93 gram/cc.) and to polyethylene structures of heavy density (0.94–0.96 gram/cc.); to polyethylene compositions formed by copolymerizing polyethylene with minor amounts of propylene, butylene, isobutylene, styrene, vinyl-acetate and similar vinyl compounds; to polymethylene derived from carbon monoxide and hydrogen as in U.S. Patent No. 2,652,372 to Farlow and Herrick; and to polypropylene, polybutylene and the like.

In forming polyethylene films either containing the special additives or to which the additive is later applied, a melt extrusion process is usually employed. In general, a molding powder or flake of polyethylene is fed continuously into a melt extrusion machine; the molten polyethylene is continuously extruded through a slot orifice, then through an air gap vertically downward into a quench bath or onto a quench roll maintained at a temperature from 25° C.–95° C., preferably from 30° C.–60° C. Usually, the polyethylene is extruded from a melt maintained at a temperature above 150° C. Tubing is usually extruded from a melt at a temperature within a range of 150° C.–200° C., whereas film is extruded at a temperature which may lie anywhere from above 250° C. to the degradation temperature of the polyethylene. An alternate process of forming polyethylene film which also employs molten polyethylene comprises milling molten polymer on closely spaced calender rolls to form a film which is conducted vertically downward into a quench bath. In either of these general methods of forming polyethylene film, the space between the point where the molten film leaves the slot orifice or the last calendar roll and the point where the molten film enters the quench bath is termed the "air gap." During passage through the air gap, the film is usually permitted to pass uninhibited through the atmosphere; and this provides for some superficial cooling. Generally, the length of the air gap ranges from 2" to as long as 15" in some cases. In some cases as illustrated in Examples 1–16, the film may be subjected to the printability treatment in the air gap. Besides forming polyethylene structures from the molten polymer, polyethylene structures may also be formed from solutions thereof in a solvent, or from dispersions of the polyethylene in an inert liquid medium such as water. Similarly, the polyethylene coatings may be applied upon other substrates from a melt, solvent solution or dispersion in a liquid medium.

The amount of additive required lies above about 0.1%, and very rarely above 10%. The precise amount will depend upon the increase in heat-seal strength desired. In cases where it is desired to recover the heat-seal strength lost by the printability treatment, the amount of additive will depend on the particular printability treatment and the extent of this treatment. In most cases, not more than about 5% of the additive need be incorporated in or applied to the surface of the polyethylene film to recover the heat-seal strength lost due to the printability treatment. In any case, the unsaturated aliphatic hydrocarbons should be added to the polyethylene structure or polyethylene coating composition prior to any printability treatment.

The following theory is offered to explain the surprising success of the present invention. However, this theory should not be construed as limiting the scope of the invention. It is believed that the additive when incorporated in the polyethylene composition is not completely compatible with the polyethylene resin. During the heat-sealing step, the additive tends to exude to the surface, thus plasticizing the surface of the polyethylene structure. If added to the surface, the additive also serves to plasticize the surface during the heat-sealing step. Plasticization of the surface, in turn, serves to increase the heat-sealability of the structure.

As many widely different embodiments can be made without departing from the spirit and scope of this invention, this invention is not limited except as defined in the appended claims.

What is claimed is:

1. A composition of matter comprising a polyethylene resin having a weight average molecular weight of 15,000 to 3,000,000 and 0.1–10%, based on the weight of said resin, of at least one ethylenically unsaturated aliphatic hydrocarbon containing from 20–35 carbon atoms.

2. A composition of matter as in claim 1 wherein the ethylenically unsaturated aliphatic hydrocarbon is 11-tricosene.

3. A composition of matter as in claim 1 wherein the ethylenically unsaturated aliphatic hydrocarbon is 17-pentatriacontene.

4. A composition of matter as in claim 1 in the form of a self-supporting structure.

5. A composition of matter as in claim 1 in the form of a packaging film.

6. A composition of matter comprising a polyethylene resin having a weight average molecular weight of 200,000 to 1,500,000 and .1–10%, based on the weight of said resin, of at least one ethylenically unsaturated aliphatic hydrocarbon containing from 20–35 carbon atoms.

7. A composition of matter as in claim 6 in the form of a packaging film.

8. A composition of matter as in claim 6 in the form of a self-supporting structure.

References Cited in the file of this patent

UNITED STATES PATENTS

| | | |
|---|---|---|
| 2,405,977 | Peters | Aug. 20, 1946 |
| 2,461,975 | Fuller | Feb. 15, 1949 |
| 2,531,408 | D'Alelio | Nov. 28, 1950 |
| 2,615,857 | Clarke | Oct. 28, 1952 |
| 2,631,954 | Bright | Mar. 17, 1953 |
| 2,691,647 | Field et al. | Oct. 12, 1954 |
| 2,700,027 | Bruson | Jan. 18, 1955 |